(12) United States Patent
Dan (10) Patent No.: US 6,332,018 B1
(45) Date of Patent: Dec. 18, 2001

(54) COMMUNICATION APPARATUS SELECTIVELY PREVENTING PRODUCTION OF A CALLERS VOICE

(75) Inventor: Kenichi Dan, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

(21) Appl. No.: 09/084,224

(22) Filed: May 26, 1998

(30) Foreign Application Priority Data

May 26, 1997 (JP) .................................................. 9-135536

(51) Int. Cl.[7] ............................. H04M 1/64; H04M 11/00
(52) U.S. Cl. ..................... 379/68; 379/100.16; 379/67.1; 379/70
(58) Field of Search ................................ 379/67.1, 68, 70, 379/76, 87, 88.27, 73, 100.15, 100.16; 369/25, 26, 27, 28, 29, 53.31, 53.35, 53.36, 124.02, 124.03; 360/31

(56) References Cited

U.S. PATENT DOCUMENTS

| | | | |
|---|---|---|---|
| 4,790,002 | * 12/1988 | D'Agosto, III et al. | 379/70 |
| 5,111,500 | * 5/1992 | Afshar et al. | 379/67.1 |
| 5,987,106 | * 11/1999 | Kitamura | 379/110.01 |
| 6,122,366 | * 9/2000 | Veschi | 379/376 |

\* cited by examiner

*Primary Examiner*—Fan Tsang
*Assistant Examiner*—Ovidio Escalante
(74) *Attorney, Agent, or Firm*—Oliff & Berridge PLC (57) ABSTRACT

In a communication apparatus capable of selectively preventing the production of a caller's voice only during the recording of a message without requiring a user to change the message volume setting, a setting unit is provided for allowing setting to be made regarding whether or not the voice signal is to be produced as a voice to be monitored from a speaker simultaneously with the recording of the voice signal. A silencing control unit, including a CPU, performs control such that, if a setting has been made by the setting unit such that the caller's voice is not to be produced, output of the voice by the speaker is prevented or reduced to a substantially inaudible volume during the recording of the caller's voice signal. In the operation of recording an incoming message (ICM) from a caller, if the volume setting data for the ICM is OFF, the CPU stores the present speaker volume setting, and then sets the speaker volume to zero, so that no sound will be produced from the speaker during the subsequent recording of an ICM. After the recording of the ICM, the CPU sets the speaker volume back to the setting stored, so that sounds will be produced from the speaker at the volume level previously set by the user.

20 Claims, 6 Drawing Sheets

Fig.6

COMMUNICATION APPARATUS SELECTIVELY PREVENTING PRODUCTION OF A CALLERS VOICE

BACKGROUND OF THE INVENTION

1. Field of Invention

The invention relates to a communication apparatus capable of recording a voice received from an external device and simultaneously outputting the voice being recorded.

2. Description of Related Art

Many conventional telephones are equipped with an answering function for recording a message from a caller and are designed to output the voice being recorded, so the called party may monitor the caller's voice from a speaker separately provided.

With such an answering function-equipped telephone, a user can hear a message from a caller as the message is being recorded, if the user is around the telephone (or the speaker) but does not or cannot answer the call for some reason. That is, the user can hear the message without needing to listen to the recorded message later.

However, since the aforementioned conventional answering function-equipped telephones output a caller's voice from a speaker, the message can also be heard by a third person near the telephone (or the speaker). Thus, the conventional answering function-equipped telephones have a problem of being unable to assure the secrecy of messages.

Many conventional automatic answering function-equipped telephones allow a user to reduce the volume of the caller's voice to a low or zero level by operating a volume button. If the volume is thus reduced, it may become necessary for a user to re-operate the volume button in order to obtain a sufficiently audible volume when the user desires to hear a message. The potential need to repeat such a troublesome operation of the volume button is another problem of the conventional art.

Although the problems of the conventional art have been stated in conjunction with a telephone set, these problems can occur not only in telephones in a narrow definition, but also in any communication apparatus equipped with a similar function, such as, for example, a facsimile machine with a message recording function.

SUMMARY OF THE INVENTION

Accordingly, it is an object of the invention to provide a communication apparatus capable of selectively preventing the production of a caller's voice during the recording of a message without requiring a user to change the caller's voice volume setting.

According to the invention, there is provided a communication apparatus including a receiver unit capable of receiving a voice signal from an external device via a communication path, a recorder unit capable of recording the voice signal received by the receiver unit, and a voice outputting unit capable of audibly outputting the voice signal. A setting unit allows a setting to be made regarding whether the caller's voice signal is to be produced by the voice outputting unit simultaneously with recording of the voice by the recorder unit. A silencing control unit performs control such that, if a setting has been made by the setting unit such that the caller's voice is not to be produced, output of the caller's voice by the voice outputting unit is prevented or reduced to a low level such that it is impossible for a third person to hear the caller's voice during the recording of the voice signal by the recorder unit.

In this communication apparatus, the setting unit allows a user to select whether the caller's voice is to be produced. Therefore, the setting unit may be formed by any device as long as the device sets and maintains either one of two states corresponding to whether the caller's voice is to be produced, and allows these settings to be detected. More specifically, the setting unit may be formed by, for example, a switch changeable between the on and off states, a memory rewritable between two different values, or the like.

The silencing control unit makes it impossible for a person to hear or understand the content of a caller's message. As long as this is achieved, the unit may completely eliminate the caller's voice or reduce the volume thereof to a substantially inaudible level.

If a setting is made in this communication apparatus by the setting unit such that a caller's voice is not to be produced, the silencing control unit makes it impossible for a person to hear the content of the caller's message during the recording of voice signals by the recording unit, thereby eliminating the danger that a third person near the communication apparatus may hear the message during the recording. The secrecy of the message is thereby assured. When a voice signal is not being recorded by the recording unit, the silencing control unit does not make it impossible for a person to hear the content of the caller's message. Therefore, when a user desires to hear the recorded message later, the user can hear the caller's voice without needing to change the setting made by the setting unit.

The communication apparatus of the invention may further include a volume adjusting unit capable of adjusting the volume of the voice output by the voice outputting unit, wherein the silencing control unit performs control such that the output of a voice by the voice outputting unit is prevented or reduced to a substantially inaudible volume, regardless of volume adjustment by the volume adjusting unit.

This embodiment allows a user to change the volume of the caller's voice as desired or in accordance with the environment of the communication apparatus installed. Further, even if the volume of the caller's voice is adjusted by the volume adjusting unit, the production of the caller's voice is substantially prevented during the recording of voice signals. Thereby, the protection of the secrecy of message can be achieved.

The silencing control unit may employ various methods in order to completely eliminate the sound of the caller's voice or reduce the volume thereof to a substantially inaudible level. For example, some of these methods may include a method in which the operation of the volume adjusting unit is prevented, or invalidated, until the silencing control ends. Furthermore, it is also possible to employ a method in which although the sound volume is allowed to change in accordance with the amount of adjustment made by the volume adjusting unit, adjustment to the maximum volume by the volume adjusting unit actually achieves only a substantially inaudible volume of the caller's voice during the silencing control. Any of these and other methods may be employed by the silencing control unit as long as the intended effect of the unit can be achieved.

In this communication apparatus, it is impossible to hear the content of the caller's voice during the recording of voice signals by the recording unit as long as the setting content of the setting unit is such that the caller's voice is not to be produced. If the setting unit uses a setting switch whose switching function and method can easily be understood or guessed, there is a danger that a third person may intentionally alter the setting made by the user. In such a case, a caller's voice may be monitored during the recording of voice signals by the recording unit. Therefore, it is desirable to devise the system so that the setting content of the setting unit cannot easily be changed by a third person.

To this end, the communication apparatus of the invention may further include a setting changing unit that changes the setting made by the setting unit when a general-purpose operating key device is operated in a predetermined sequence.

With this setting changing unit provided, the general-purpose operating key device must be operated in a predetermined sequence in order to change the setting content of the setting unit. Therefore, a person who does not know the sequence cannot easily change the setting content of the setting unit.

The sequence of operating the general-purpose operating key device, which is used for purposes other than the purpose of changing the setting made by the setting unit, may be any specific key-operating sequence. If there is a need to enhance the protection of the setting content, the sequence may include inputting secret number or any other sequence pre-registered by a user. Thereby, it becomes substantially impossible for a person who does not know the registered sequence to change the setting content of the setting unit.

BRIEF DESCRIPTION OF THE DRAWINGS

A preferred embodiment of the present invention will be described in detail with reference to the following figures wherein.

DETAILED DESCRIPTION OF PREFERRED EMBODIMENTS

A preferred embodiment of the present invention will be described in detail hereinafter with reference to the accompanying drawings.

A communication apparatus according to this embodiment is a facsimile apparatus capable of transmitting an image through a telephone line in a facsimile communication mode and also capable of functioning as a telephone to transmit voices.

Figure 1:
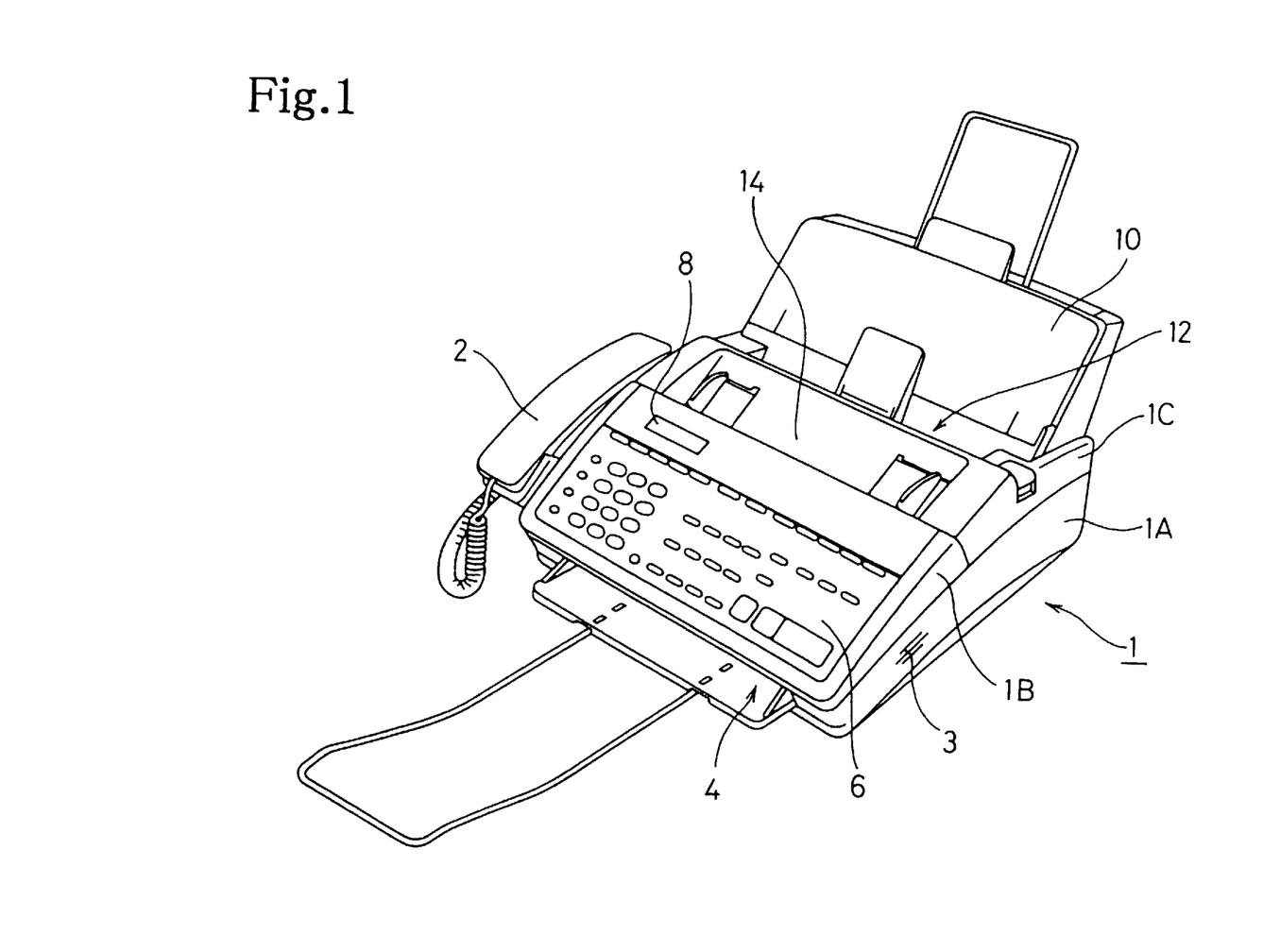
FIG. 1 is a perspective view of an external appearance of a facsimile apparatus according to a preferred embodiment of the invention.

Referring to FIG. 1, a facsimile apparatus 1 has an exterior substantially formed by a lower case 1A, an operating panel 1B fixed to an upper surface of a forward portion of the lower case 1A, and an upper cover IC mounted on an upper surface of a rearward portion of the lower case 1A.

Mounted on the left side of the lower case 1A is a handset 2 that may be used when the facsimile apparatus 1 is used as a telephone or may be used to hear a signal tone from an exchange. Disposed on the right side of the lower case 1A is a speaker 3 for outputting voices and sounds (hereinafter, collectively referred to as "voices") that are being transmitted and received. Formed in a front portion of the lower case 1A is a document outlet 4 through which a document that has been scanned to obtain an image to be transmitted or copied, is discharged. The operating panel 1B carries in its upper surface, a key input device 6 having many operating keys, and a liquid crystal display (LCD) 8 capable of displaying characters and the like, in a dot matrix mode. A paper sheet case 10 for housing recording sheets to be fed for recording, protrudes from a rear portion of an upper surface of the upper cover 1C. Formed on a front side of the sheet case 10 is a recorded sheet outlet 12 through which a sheet carrying the recording of an image received from an external apparatus or a copy image scanned, is discharged. Formed on an upper surface of a forward portion of the upper cover 1C is a document tray 14 for placing a document that is to be scanned to obtain an image to be transmitted or copied.

Figure 2:
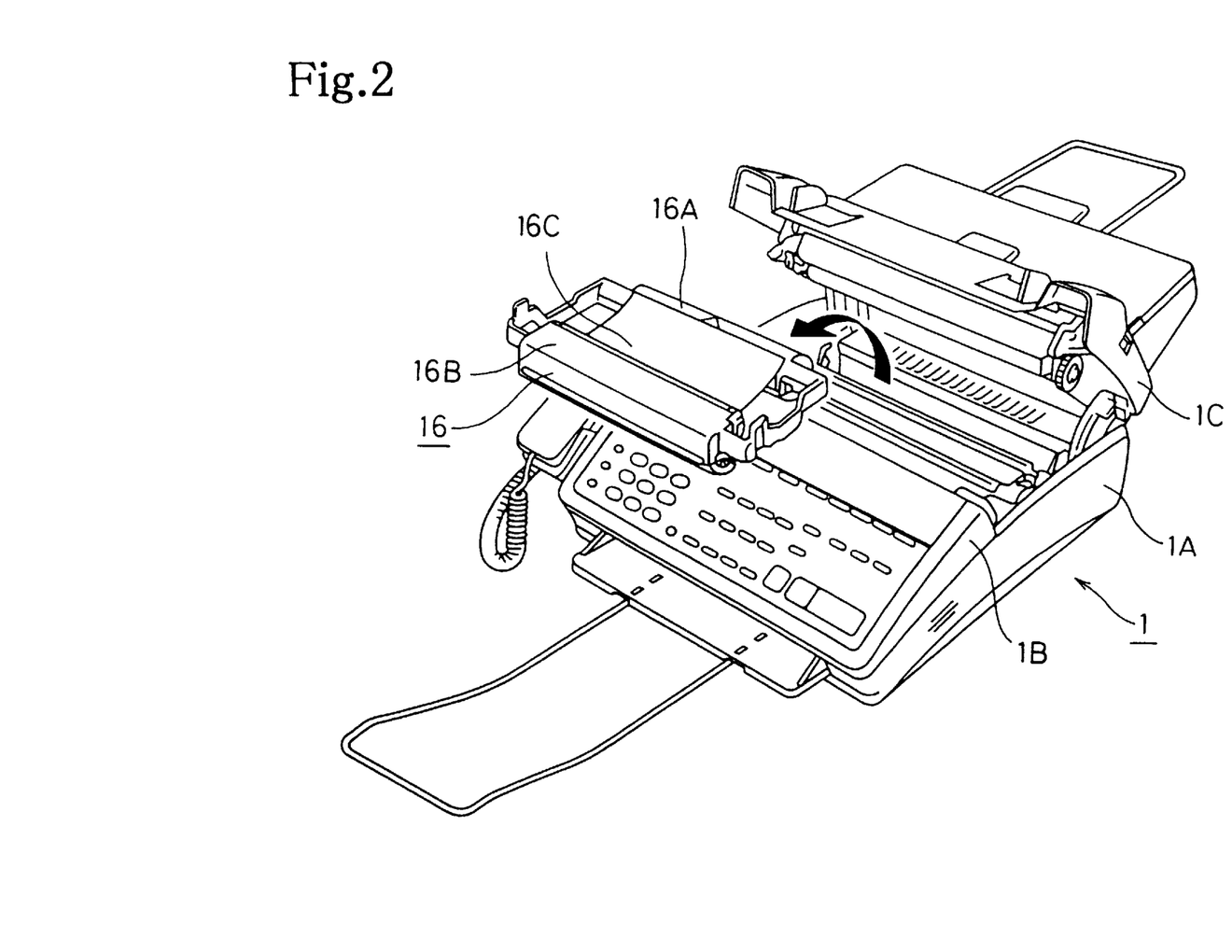
FIG. 2 is a perspective view of the facsimile apparatus shown in FIG. 1, wherein an upper cover is opened and an ink ribbon cartridge is detached.

The upper cover 1C is connected to the lower case 1A so as to be pivotable about a rear end portion of the lower case 1A, as shown in FIG. 2. Therefore, the upper cover 1C can be turned upward to an open position when an ink ribbon cartridge 16 is to be set in or replaced, or when the maintenance of an interior portion of the facsimile apparatus 1 is to be performed, or the like. The ink ribbon cartridge 16 has a pair of rolls that are respectively contained in an ink ribbon feeder portion 16A and an ink ribbon recovering portion 16B. An ink ribbon 16C having approximately the same width as the recording sheets is supported by the two rolls, extending therebetween with an appropriate tension. The ink ribbon cartridge 16 is designed so that new portions of the ink ribbon 16C are fed from the ink ribbon feeder portion 16A and the used portions of the ink ribbon 16C are wound up by the ink ribbon recovering portion 16B as recording progresses. An upper side surface of the ink ribbon 16C is coated with a hot-melt ink. During recording, a recording sheet is placed face-to-face on the ink-coated surface of the ink ribbon 16C, and they are together conveyed through a gap between a platen roller and a line-type recording head having approximately the same width as the recording sheet. The thermal transfer recording of an image is thus performed.

A control system of the facsimile apparatus 1 will next be described in reference to FIG. 3. The control system of the facsimile apparatus 1 includes a known CPU 21 for controlling the operations of various units and portions of the facsimile apparatus 1, a ROM 22, an EEPROM 23, a RAM 24, a printer unit 26, a scanner unit 27, a network control unit (hereinafter, referred to as NCU) 28, a modem 29, an amplifier 32, a document sensor 34, a recording sheet sensor 35, an ink ribbon sensor 36, an upper cover sensor 37, and the like. The CPU 21 also controls the key input device 6 and the LCD 8.

The ROM 22 stores various control programs executed by the CPU 21, as well as various data and the like. The EEPROM 23 is a non-volatile memory capable of maintaining the data stored therein even when power is not supplied. The EEPROM 23 stores various setting data that are set and changed as desired by a user, and the like. The RAM 24 is a memory for temporarily storing various data while an operation is being executed. The RAM 24 has various storage areas, for example, a transmission image area for storing the image data of an image to be transmitted before it is actually transmitted, a received image area for storing the image data of an image received before it is printed, an outgoing message area for storing an outgoing message (hereinafter, referred to as "OGM") that is transmitted to a caller or an external apparatus during an automatic answering mode, an incoming message area for storing an incoming message (hereinafter, referred to as "ICM") received from a caller or an external apparatus during the automatic answering mode, and the like.

The printer unit 26 is a mechanism for performing thermal transfer recording on a recording sheet. More specifically, the printer unit 26 includes a conveying motor for conveying a recording sheet, a driver circuit connected between the conveying motor and the CPU 21, a line-type recording head for performing thermal transfer recording on a recording sheet, a driver circuit connected between the recording head and the CPU 21, and the like. The scanner unit 27 is a mechanism for optically reading an image from a document and converting the image into electric signals. More specifically, the scanner unit 27 includes a conveying motor for conveying a document, a line-type image sensor for reading an image from a document, a driver circuit connected between the image sensor and the CPU 21, and the like.

The NCU 28 is a device for transmitting signals to and receiving signals from another facsimile apparatus through a telephone line. The modem 29 is a device for modulating and demodulating signals that are to be transmitted and have been received. The amplifier 32 is a circuit for amplifying the tone signals that are to be transmitted and have been received in order to output voices to the speaker 3.

The document sensor 34 detects the presence/absence of a document set on the document tray 14. The recording sheet sensor 35 detects the presence/absence of a recording sheet set in the paper sheet case 10. The ink ribbon sensor 36 detects the presence/absence of the ink ribbon 16C. The upper cover sensor 37 detects whether the upper cover 1C is open or closed. These sensors detect whether an object of detection is present at a predetermined position. Each sensor may be formed by, for example, a contact sensor that switches on or off in accordance with the contact or non-contact with a detection object, an optical sensor having a light emitting element and a light receiving element that are arranged so that a detection object will be located therebetween, an optical sensor having a light emitting element that emits light in the direction to a detection object and a light receiving element that receives light reflected from the object, and the like.

The facsimile apparatus 1 is connected to a telephone line 41 by the NCU 28. The telephone line 41 is connected to an exchange 42. An external communication apparatus (e.g., a facsimile apparatus, a telephone or the like) 44 is connected to the exchange 42 by a telephone line 43. Alternatively, the facsimile device 1 may be wireless and communicate with other devices via a wireless communication network (not shown).

If one of the facsimile apparatus 1 and the external communication apparatus 44 outputs a request for connection to the other apparatus, the exchange 42 calls up the other apparatus. If the other apparatus answers the call, the exchange 42 connects the facsimile apparatus 1 and the external communication apparatus 44, thereby enabling the two apparatuses to communicate.

Figure 4:
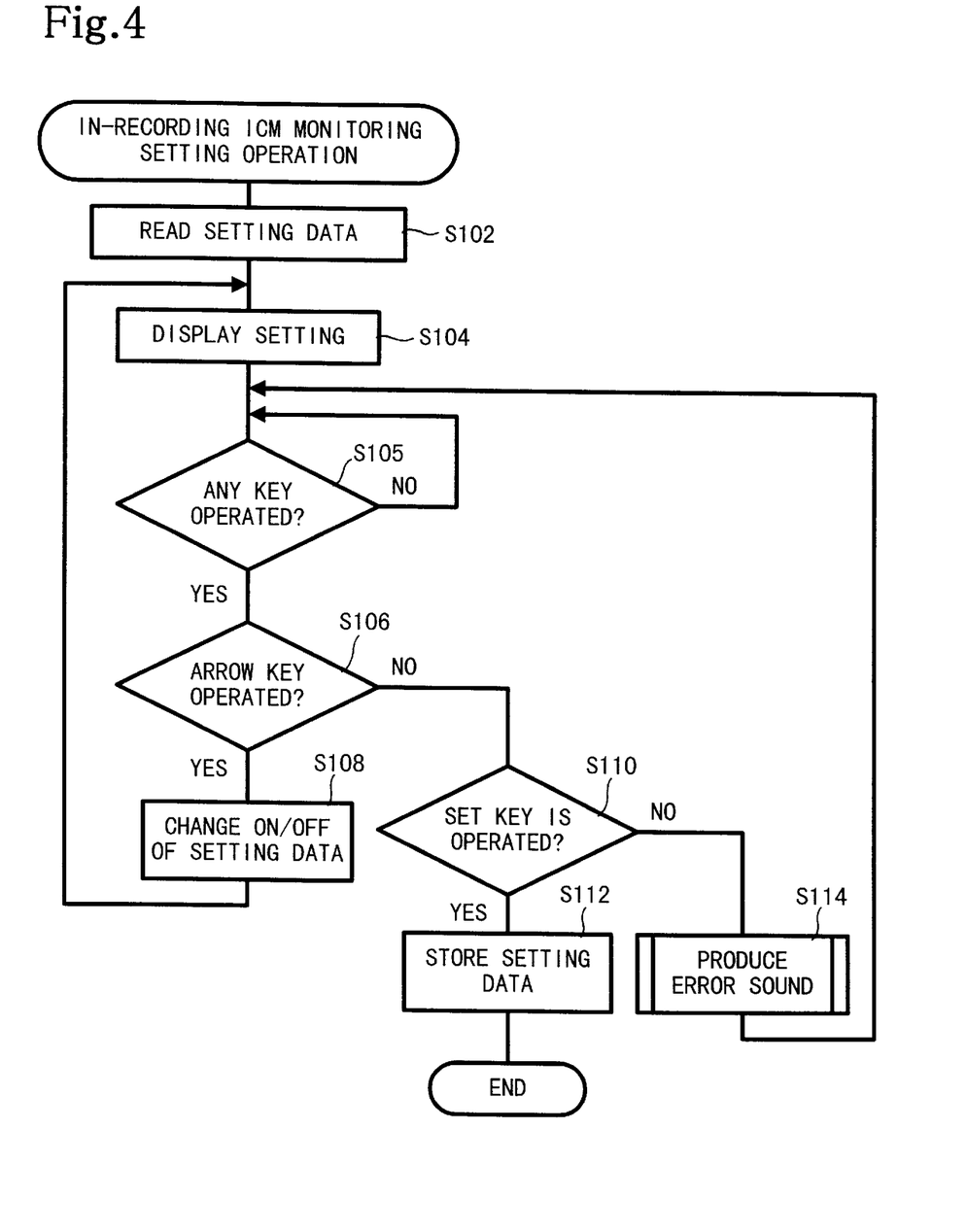
FIG. 4 is a flowchart of an in-recording incoming message monitoring setting operation.

An in-recording ICM monitoring setting operation performed by the facsimile apparatus 1 will be described with reference to the flowchart of FIG. 4. The in-recording ICM monitoring setting operation sets whether, during the recording of an ICM, the ICM is to be simultaneously output from the speaker 3.

In the facsimile apparatus 1, the CPU 21 constantly monitors the operated state of the various operating keys of the key input device 6. If "FUNCTION" key, "6" key, "6" key and "SET" key, for example, are sequentially operated in that order, the CPU 21 starts the in-recording ICM monitoring setting operation illustrated in FIG. 4.

When the in-recording ICM monitoring setting operation is started, the CPU 21 first reads setting data for in-recording ICM monitoring from the EEPROM 23 in step S102. This setting data is in the ON state when a voice is to be output, and it is in the OFF state when a voice is not to be output. After the setting data is read out, the CPU 21 displays the present setting on the LCD 8 in step S104. In this embodiment, either "MESSAGE MONITOR ON" or "MESSAGE MONITOR OFF" is displayed in accordance with the setting data.

Subsequently in step S105, the CPU 21 repeatedly checks whether any of the keys of the key input device 6 have been operated. If any of the keys of the key input device 6 is operated (YES in step S105), the CPU 21 then checks in step S106 whether the key operated is either a leftward arrow key ("←" key) or a rightward arrow key ("←" key). If either the leftward arrow key or the rightward arrow key has been operated (YES in step S106), the CPU 21 changes the ON/OFF state of the setting data in step S108, and then returns to step S104. That is, the display on the LCD 8 can be alternately changed between "MESSAGE MONITOR ON" and "MESSAGE MONITOR OFF" by a user operating the leftward arrow key or the rightward arrow key. If the CPU 21 determines that neither the leftward arrow key nor the rightward arrow key has been operated (NO in step S106), and then determines in step S110 that the "SET" key is operated (YES in step S10), that is, if the user has operated the "SET" key instead of operating either the leftward arrow key or the rightward arrow key, the CPU 21 stores the setting data at that time into the EEPROM 23 in step S112, and then ends this operation.

If an operating key of the key input device 6, other than the leftward arrow key, the rightward arrow key and the "SET" key, is operated (NO in step S106 and NO in step S110), the CPU 21 causes an error sound to be produced in step S114 in order to inform the user that an inappropriate key operation has been performed. Subsequently, the CPU 21 returns to step S105 and waits for the operation on any key of the key input device 6.

By the in-recording ICM monitoring setting operation described above, the ON or OFF state of the setting data is stored in a predetermined storage area provided in the EEPROM 23.

Figure 5:
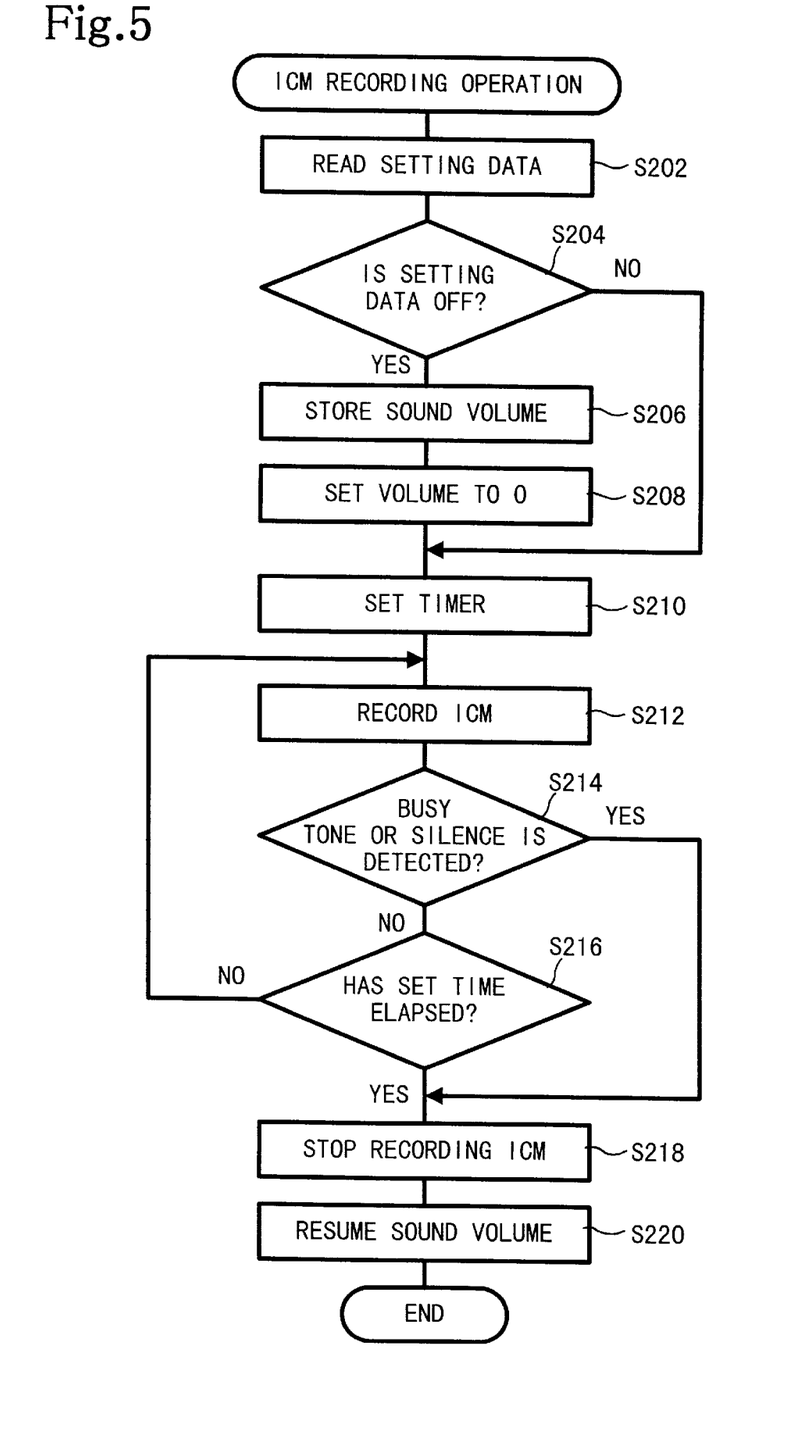
FIG. 5 is flowchart of an incoming message recording operation.

An ICM recording operation will next be described with reference to the flowchart of FIG. 5. In the ICM recording operation, an ICM from a caller is recorded during the automatic answering mode. When the connection with a caller device (external apparatus) is established during the automatic answering mode, an OGM transmitting operation is performed to transmit a preset OGM to the external apparatus, before the ICM recording operation illustrated in FIG. 5, is started.

When the ICM recording operation is started, the CPU 21 first reads the setting data for the in-recording ICM monitoring from the EEPROM 23 in step S202. The CPU 21 then checks in step S204 whether the setting data is in the OFF state. If the data is in the OFF state (YES in step S204), the CPU 21 stores the present sound volume setting into the RAM 24 in step S206, and sets the sound volume to zero in step S208, thereby establishing a state where a sound is no longer produced from the speaker 3 regardless of the sound volume setting that the user has previously made.

Subsequently in step S210, the CPU 21 sets a timer for the ICM recording. In step S212, the CPU 21 operates to record an ICM. In the operation of step S212, the voices from the external apparatus are encoded into voice data by a predetermined waveform coding method, and the voice data is stored into the ICM storage area of the RAM 24. In step S214, the CPU 21 determines whether the present state is either a busy tone state where a busy tone is being received from the exchange 42 or a continuously silent state where a silent state continues for a predetermined length of time . If the present state is neither the busy tone state nor the continuously silent state (NO in step S214), the CPU 21 then determines in step S216 whether a predetermined time has elapsed following the setting of the timer in step S210. If the predetermined time has not elapsed (NO in step S216), the CPU 21 returns to step S212. In this manner, the recording is continued while the operation in S212–S216 is repeated. While the operation in S212–S216 is being repeated, no sound is produced from the speaker 3, so that there is no danger that a third person may hear the ICM. The secrecy of the ICM is thereby assured.

If a busy tone is received from the exchange 42, a silent state continues at least for a predetermined length of time (YES in step S214), or if the timer set in step S210 times out (YES in step S216), the CPU 21 stops the recording of the ICM in step S218. Subsequently in step S220, the CPU 21 sets the sound volume back to the value stored in the RAM 24 in step S206, thereby establishing a state where sounds will be produced from the speaker 3 at the volume preset by the user.

Figure 6:
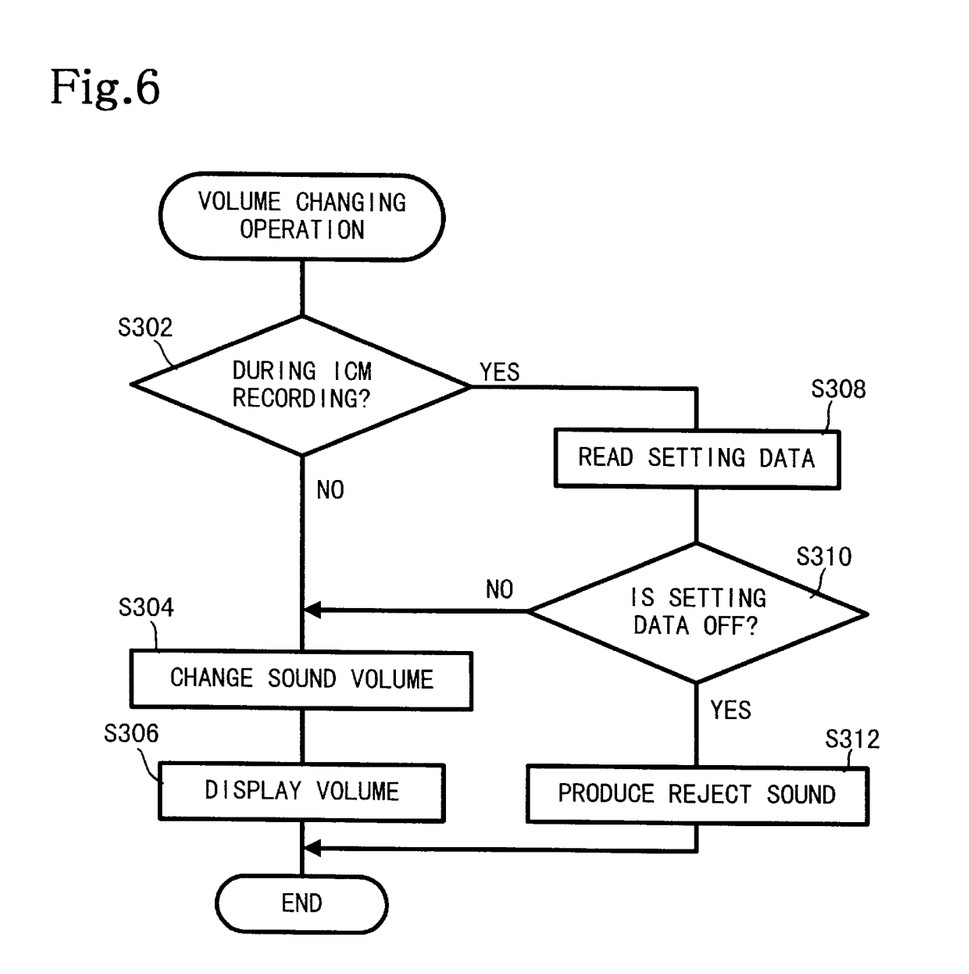
FIG. 6 is flowchart of a sound volume changing operation.

If the user operates the "VOLUME" key of the key input device 6, the CPU 21 starts a volume changing operation illustrated in FIG. 6, regardless of whether the ICM recording operation is being performed.

When the volume changing operation is started, the CPU 21 first checks in step S302 whether an ICM is being recorded. If an ICM is not being recorded (NO in step S302), the CPU 21 sets a new sound volume level in accordance with the volume level before the "VOLUME" is operated and the amount of operation performed on the "VOLUME" key, in step S304. Subsequently in step S306, the CPU 21 displays the set volume level on the LCD 8. Thereby, a state is established where sounds will be produced from the speaker 3 at the volume level displayed on the LCD 8.

Conversely, if in step S302 the CPU 21 finds that an ICM is being recorded (YES in step S302), the CPU 21 reads the setting data for the in-recording ICM monitoring from the EEPROM 23 in step S308, and checks in step S310 whether the setting data is in the OFF state. If the setting data is in the ON state (NO in step S310), the operation in steps S304 and S306 is performed. If the setting data is in the OFF state (YES in S310), the CPU 21 instead causes a reject sound to be produced in step S312. The volume changing operation is thereby completed.

Therefore, if an ICM is being recorded and the setting data for the in-recording ICM monitoring is in the OFF state, the sound volume is not changed, despite the operation of the "VOLUME" key. Therefore, since the sound volume was set to zero in the ICM recording operation, the state where no sound is produced from the speaker 3 is maintained even if the "VOLUME" key is operated.

With this facsimile apparatus 1, if the setting data for the in-recording ICM monitoring stored in the EEPROM 23 is in the OFF state, the volume of sound from the speaker 3 is set to zero and the "VOLUME" key is disabled only during the ICM recording, so that the ICM being recorded will not be heard by a third person around the facsimile apparatus 1. The secrecy of the ICM is thereby assured. When an ICM is not being recorded, sounds will be produced from the speaker 3 and the sound volume can be adjusted by operating the "VOLUME" key regardless of whether the setting data for the in-recording ICM monitoring is in the ON or OFF state. Therefore, when the user desires to hear the ICM later, the user can hear the ICM at a desired volume level, without needing to change the setting by using the above-described setting device.

Furthermore, the key operating sequence of "FUNCTION", "6", "6" and "SET" keys, for example, must be completed, in order to make it possible to change the ON/OFF state of the setting data for the in-recording ICM monitoring. Therefore, a person who does not know the key operating sequence cannot easily change the ON/OFF state of the setting data for the in-recording ICM monitoring. Further, since the setting data for the in-recording ICM monitoring is stored in the EEPROM 23, the ON/OFF state of the setting data will be maintained even if a power-down occurs. Therefore, the facsimile apparatus 1 of this embodiment reduces the possibility of alteration of the ON/OFF state of the setting data by accident or with an intention by a third person, compared with an apparatus wherein a dedicated change switch is provided in a key input device, or an apparatus wherein the setting data is stored in a volatile memory.

While the invention has been described in conjunction with the embodiment, the invention can also be carried out in various other forms.

For example, although, in the facsimile apparatus 1, the sound volume is reduced to zero at the time of the ICM recording if the setting data for the in-recording ICM monitoring is in the OFF state, it is also possible to reduce the sound volume to a very low level such that the content of an ICM cannot be heard or understood. The setting of the sound volume to zero provides the elimination of the danger that the ICM being recorded may be heard by a third person. The reduction of the sound volume to a very low level provides the indication that an ICM is being recorded. Therefore, the latter embodiment may be useful in an environment where there is no third person intending to hear an ICM.

Although the facsimile apparatus 1 is designed so that the sound volume can be adjusted by the "VOLUME" key, the invention may be applied to an apparatus that does not have a "VOLUME" key, or an apparatus wherein the volume of the voices being monitored cannot freely be changed. In such applications, the voices being monitored during the recording of an ICM can also be reduced to a very low or zero level.

Furthermore, although, in the facsimile apparatus 1, the setting data of the in-recording ICM monitoring is allowed to be changed after a few general-purpose keys of the key input device 6 are operated in a predetermined sequence, the key operating sequence may include a sequence that can be changed as desired by a user in order to enhance the protection of the setting data. More specifically, it is also possible to provide a construction in which a user can pre-set and store a secret number, and keys must be operated in a sequence corresponding to the secret number in order to make it possible to change the setting data. Furthermore, since the registration of a secret number limits the keys to be operated to input the secret number to the number keys, this limitation may be eliminated by making all of the operating keys of the key input device 6 available for the registration of a secret code. With a secret code registered, keys must be operated in a sequence corresponding to the secret code in order to make it possible to change the setting data In any case, it becomes possible to change the setting data for the in-recording ICM monitoring only when general-purpose keys are operated in a predetermined sequence, so that the possibility of alteration of the setting data by a third person is considerably reduced.

Although the invention has been described in conjunction with the facsimile apparatus 1, it should be apparent that the application of the invention is not limited to facsimile apparatuses. The invention may be applied to various communication apparatuses, for example telephones, personal computers with communication functions, and the like, as long as the communication apparatuses have a function of recording voices received from an external communication apparatus and a function of outputting voices from a speaker while recording.

Figure 3:
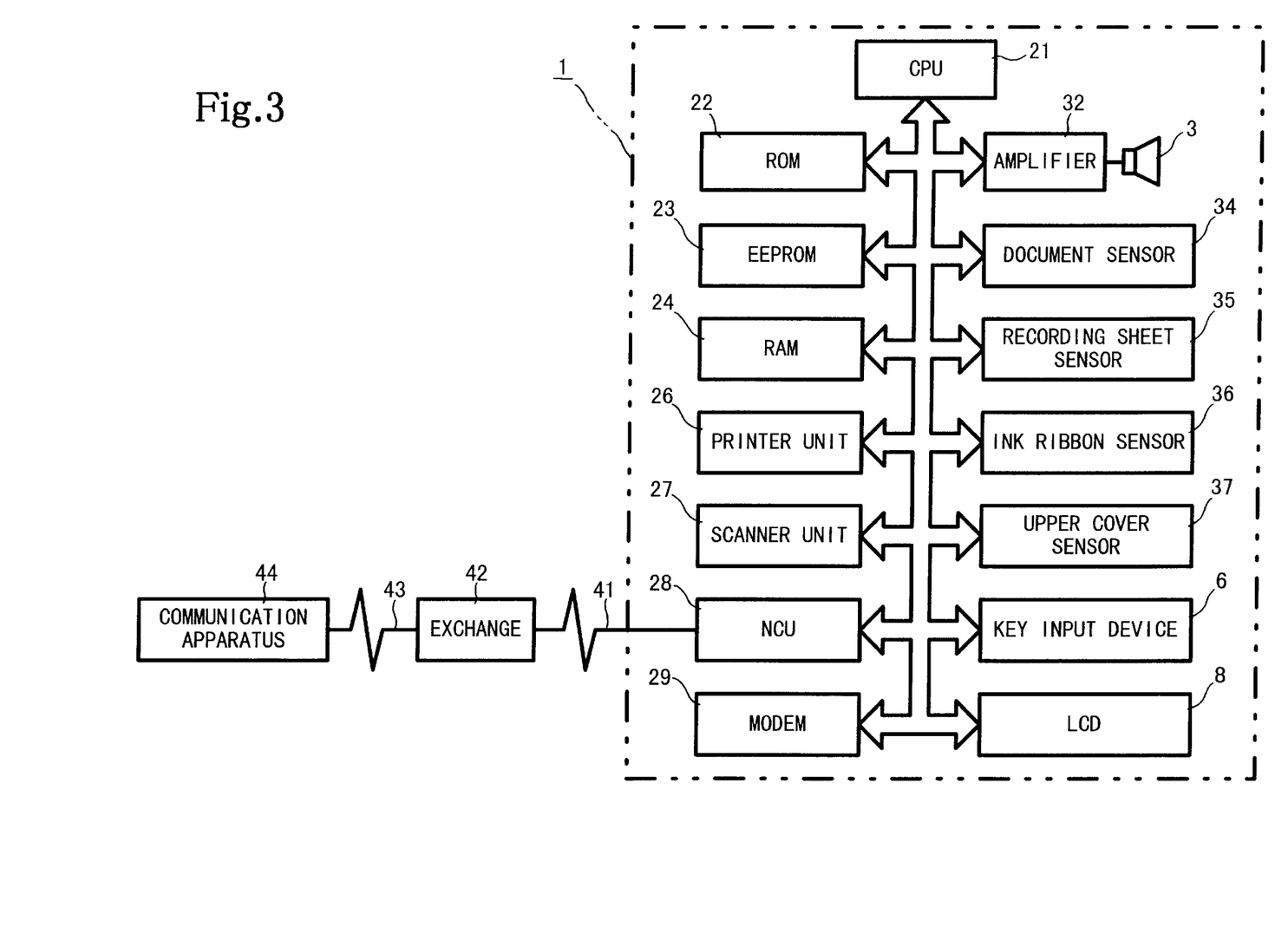
FIG. 3 is a block diagram of the control system of the facsimile apparatus.

As shown in FIG. 3, control of the voice signal output in the facsimile apparatus 1 is preferably implemented using the ROM 22. However, the control of the voice signal output can also be implemented using the EEPROM 23, a PROM, an EPROM, or a CD-ROM and floppy-disk drive, or the like.

It is to be understood that the invention is not restricted to the particular forms shown in the foregoing embodiment. Various modifications and alterations can be made thereto without departing from the scope of the invention.

What is claimed is:

1. A communication apparatus, comprising:
   a receiver unit that receives a voice signal from an external device through a communication path;
   a recorder unit that records the voice signal received by the receiver unit;
   a voice outputting unit that audibly outputs the voice signal received by the receiving unit;
   a setting unit for selecting whether the voice signal received by the receiver unit is to be audibly output by the voice outputting unit while the voice signal is being recorded by the recorder unit; and
   a silencing control unit that prevents the voice signal from being audibly output while the voice signal is being recorded by the recorder unit, based on the selection by the setting unit, and during playback of a previously recorded voice signal allows the previously recorded voice signal to be audibly output without changing the setting unit selection.

2. The communication apparatus of claim 1, wherein the silencing control unit reduces the voice signal to a substantially inaudible volume during the recording of the voice signal by the recorder unit.

3. The communication apparatus of claim 1, further comprising a volume adjusting unit that adjusts the volume of the voice signal output by the voice outputting unit.

4. The communication apparatus of claim 3, wherein the silencing control unit prevents the output of the voice signal by the voice outputting unit regardless of volume adjustment by the volume adjusting unit.

5. The communication apparatus of claim 3, wherein the silencing control unit reduces the output of the voice signal by the voice outputting unit to a substantially inaudible volume regardless of volume adjustment by the volume adjusting unit.

6. The communication apparatus of claim 1, wherein the silencing control unit returns a volume of the voice outputting unit to a previous setting after the voice signal has been recorded.

7. The communication apparatus of claim 1, further comprising a setting changing unit that changes the setting made by the setting unit.

8. The communication apparatus of claim 7, wherein the setting changing unit changes the setting made by the setting unit based inputs made to a general-purpose operating key device that are operated in a predetermined sequence.

9. The communication apparatus of claim 8, wherein the setting changing unit changes the setting made by the setting unit based on the input of a user determined code to the general purpose operating key device.

10. A communication apparatus, comprising:
    receiving means for receiving a voice signal from an external device through a communication path;
    recording means for recording the voice signal received by the receiver means;
    voice outputting means for audibly outputting the voice signal received by the receiving means;
    setting means for selecting whether the voice signal received by the receiver means is to be audibly output by the outputting means while the voice signal is being recorded by the recorder means; and
    silencing control means for preventing the voice signal from being audibly output while the voice signal is being recorded by the recorder means, based on the selection by the setting means and during playback of a previously recorded voice signal allows the previously recorded voice signal to be audibly output without changing the setting means selection.

11. The communication apparatus of claim 10, wherein the silencing control means reduces the voice signal to a substantially inaudible volume during the recording of the voice signal by the recorder means.

12. The communication apparatus of claim 10, further comprising volume adjusting means for adjusting the volume of the voice signal output by the voice outputting means.

13. The communication apparatus of claim 12, wherein the silencing control means prevents the output of the voice signal by the voice outputting means regardless of volume adjustment by the volume adjusting means.

14. The communication apparatus of claim 12, wherein the silencing control means reduces the output of the voice signal by the voice outputting means to a substantially inaudible volume regardless of volume adjustment by the volume adjusting unit.

15. The communication apparatus of claim 10, wherein the silencing control means returns the volume of the voice outputting means to a previous setting after the voice signal has been recorded.

16. The communication apparatus of claim 10, further comprising setting changing means for changing the setting made by the setting means.

17. The communication apparatus of claim 16, wherein the setting changing means changes the setting made by the setting means based inputs made to a general-purpose operating key device that are operated in a predetermined sequence.

18. The communication apparatus of claim 17, wherein the setting changing means changes the setting made by the setting unit based on the input of a user determined code to the general purpose operating key device.

19. A storage medium for storing a voice signal from an external device through a communication path;
- a program for recording the received voice signal;
- a program for audibly outputting the voice signal received;
- a program for selecting whether the voice signal received is to be audibly output while the voice signal is being recorded; and
- a program for preventing the voice signal from being audibly output while the voice signal is being recorded, based on an output from the program for selecting and during playback of a previously recorded voice signal allows the previously recorded voice signal to be audibly output without further output from the program for selecting.

20. A method for controlling audible voice signal output in a communication apparatus, comprising:
- receiving a voice signal from an external device through a communication path;
- recording a voice signal from an external device through a communication path;
- recording the voice signal received;
- audibly outputting the voice signal;
- selecting whether the voice signal received is to be audibly output while the voice signal is being recorded; and
- preventing the voice signal from being audibly output while the voice signal is being recorded, based on the selection made in the selection step and during playback of a previously recorded voice signal allowing the previously recorded voice signal to be audibly output without further making a selection in the selection step.

* * * * *